(12) United States Patent
Tang et al.

(10) Patent No.: US 7,106,851 B2
(45) Date of Patent: Sep. 12, 2006

(54) SYSTEM AND METHOD FOR CONNECTING PENDING AND PRESET TELEPHONE CALLS TO FACILITATE TRANSITIONING TO A PHONE CALL

(75) Inventors: John C. Tang, Palo Alto, CA (US); Mark A. Bilezikjian, San Francisco, CA (US); Nicole Y. Mordecai, Weston, MA (US); James M. A. Begole, Mountain View, CA (US); Brian K. Raymor, McLean, VA (US)

(73) Assignee: Sun Microsystems, Inc., Santa Clara, CA (US)

( * ) Notice: Subject to any disclaimer, the term of this patent is extended or adjusted under 35 U.S.C. 154(b) by 393 days.

(21) Appl. No.: 10/349,381

(22) Filed: Jan. 21, 2003

(65) Prior Publication Data

US 2004/0141599 A1 Jul. 22, 2004

(51) Int. Cl.
 *H04M 1/00* (2006.01)
(52) U.S. Cl. .................................. 379/355.01
(58) Field of Classification Search ........... 379/355.01, 379/216.01, 93.24; 455/460, 461, 417
See application file for complete search history.

(56) References Cited

U.S. PATENT DOCUMENTS 5,483,352 A * 1/1996 Fukuyama et al. ......... 358/402
5,909,487 A * 6/1999 Mainker ................. 379/209.01
6,754,323 B1* 6/2004 Chang et al. ........... 379/205.01
6,804,509 B1* 10/2004 Okon et al. .............. 455/414.1
2001/0005684 A1* 6/2001 Inkinen et al. .............. 455/556
2002/0071539 A1* 6/2002 Diament et al. ........ 379/202.01
2002/0164006 A1* 11/2002 Weiss ..................... 379/201.01
2003/0041030 A1* 2/2003 Mansfield ..................... 705/50

* cited by examiner

*Primary Examiner*—Sinh Tran
*Assistant Examiner*—Walter F Briney, III
(74) *Attorney, Agent, or Firm*—Martine Penilla & Gencarella, LLP

(57) ABSTRACT

A system and method for connecting pending and preset telephone calls to facilitate transitioning to a phone call. Embodiments of the present invention include a method for anticipating and connecting a telephone call comprising identifying a trigger action associated with an anticipated outgoing telephone call, retrieving a phone number associated with said trigger action, and automatically setting a programmable speed dial button wherein by selecting the speed dial button, said phone number associated with said trigger action is dialed. Embodiments of the present invention also include a system for anticipating and connecting outgoing telephone calls comprising a computer system comprising a processor coupled to a bus, a database coupled to said bus, a call engine coupled to said bus wherein said call engine identifies trigger actions associated with outgoing telephone calls and retrieves phone numbers associated with said trigger actions, and a telephone coupled to said computer system wherein said telephone is coupled to a telephone network.

40 Claims, 17 Drawing Sheets

SYSTEM AND METHOD FOR CONNECTING PENDING AND PRESET TELEPHONE CALLS TO FACILITATE TRANSITIONING TO A PHONE CALL

BACKGROUND OF THE INVENTION

1. Field of the Invention

The present invention relates to the field of telephony. More specifically, embodiments of the present invention relate to a method and system for connecting pending and preset telephone calls to facilitate transitioning to a phone call.

2. Related Art

The field of personal communications has grown exponentially over the past 10 years. Users have many options when they want to communicate with someone including for instance telephones, cellular phones, electronic mail and instant messaging. It is convenient to have many options when communicating because sometimes one method of communication is more appropriate than another. In addition to many communication options, multiple advances in each of the communications areas provide more communication convenience than ever. For example, caller ID allows a user to view the identity of the calling party without answering a call. If the called party does not wish to take a call from a particular caller, the user has the option to screen the calls without the knowledge of the caller.

Caller identification provides the called party with the name and/or telephone number of the calling party. Caller identification is usually provided to a customer by its local central office. Most often, each central office has access to a local database containing telephone numbers and the corresponding names of people within its local area. Before connecting a call to the called party, the central office searches its database for the telephone number of the calling party. If the telephone number is found within the database, the name corresponding to that number will be accessed and delivered to the called party by the central office using a predetermined protocol. Caller ID relies on a computer to direct information to a called party. Caller ID is useful for identifying a caller's identity, but it is not typically useful for placing a call.

For example, Prior Art FIG. 1A illustrates a conventional caller identification system 10 implemented on a conventional telephone. Telephone 11 comprises a receiver 22, number keys 20, special function buttons 18 and caller ID screen 12. When a call is received, the caller's identification 14 is displayed on the screen 12 as well as the telephone number 16 associated with the caller's ID 14. When a call is received, the receiving user can identify the caller and choose whether to take or ignore the incoming call. While useful on incoming telephone calls, conventional caller identification is not useful for outgoing telephone calls.

Conversely, on many cellular phones, call history is stored in a memory for easy retrieval in the future. For example, if a call is missed, on many cellular phones, the phone number corresponding to the missed call is stored in memory. If a user wants to call the missed caller, a look-up can be done by viewing the missed call database. Many times, a user can push a single button to call a missed phone number without having to type the number into the phone.

Prior Art FIG. 1B illustrates a conventional cellular telephone system 30 that uses caller identification to facilitate outgoing calls. In Prior Art FIG. 1B, cellular telephone 32 comprises a display screen 34 and menu buttons 38 and 36. When an incoming call is missed, typically the caller's identity and telephone number are displayed on screen 34. After a call is missed, the user can select button 38 to call the missed phone number or button 36 to store the phone number and corresponding name to a phonebook database.

Although caller ID technology is convenient to identify the identity of an incoming caller and for calling back a missed caller, conventional caller identification does not facilitate any telephony functions without an initial incoming call.

Moreover, many phone calls are a result of some other related action. For example, a user may receive an electronic mail message and decide to call the person back to respond. Or, a user may receive an instant message (IM) and decide to call rather than type out a response. Or, a user may look up a person in an address book and decide to then call the person.

SUMMARY OF THE INVENTION

Accordingly, what is needed is a system and method for identifying triggers associated with causing a user to place an outgoing call and for automatically calling a party associated with the trigger. In one aspect, the system can identify communication with another person by examining triggers such as electronic mail messages, instant messages, cellular phone calls and other communication triggers and based on particular triggers, an outgoing call can be automatically connected. In another aspect, the system and method can use a computer database and rules engine to "learn" associated actions and predict future actions based on previous actions or triggers.

The present invention recognizes that related actions can be identified that often lead to placing a phone call in response to the action. The present invention streamlines that process by programming a telephone device to set up a call in anticipation of the user transferring from one communication or data mechanism to a phone call.

The present invention recognizes that telephony is only one point along a spectrum of audio connections between people, including intercom "push-to-talk" audio and hands free "connected-all-the-time" audio media. The embodiments of the present invention therefore allow smooth transitions into and out of phone calls from other interactions controlled by a computer, for instance.

Specifically, a system and method for connecting pending and preset telephone calls to facilitate transitioning to a phone call are presented. Embodiments of the present invention include a method for anticipating and connecting a telephone call comprising identifying a trigger action associated with an anticipated outgoing telephone call, retrieving a phone number associated with said trigger action, and automatically setting a programmable speed dial button wherein by selecting the speed dial button, said phone number associated with said trigger action is automatically dialed.

Embodiments of the present invention also include a system for facilitating outgoing telephone calls comprising a computer system comprising a processor coupled to a bus, a database coupled to said bus, a call engine coupled to said bus wherein said call engine identifies trigger actions associated with outgoing telephone calls and retrieves phone numbers associated with said trigger actions, and a telephone coupled to said computer system wherein said telephone is coupled to a telephone network.

Embodiments of the present invention may be used to automatically set-up pending phone calls, e.g., by automatically programming call information into a speed dial button, or, set-up a preset phone call where the connection is already made and the line is placed on hold awaiting the user to merely pick up the handset to become part of the call.

Exemplary triggers which lead to automatic set-up of pending and preset phone calls include, for example, receiving an electronic mail message, receiving an instant message from someone, looking up a person's information in an electronic phone book database, receiving a voice mail message from someone, examining a web page, talking to someone on a cell phone, etc. Triggers can also be based on calendar or meeting information programmed into an electronic calendar application.

These and other objects and advantages of the present invention will no doubt become obvious to those of ordinary skill in the art after having read the following detailed description of the preferred embodiments, which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Figure 1A:
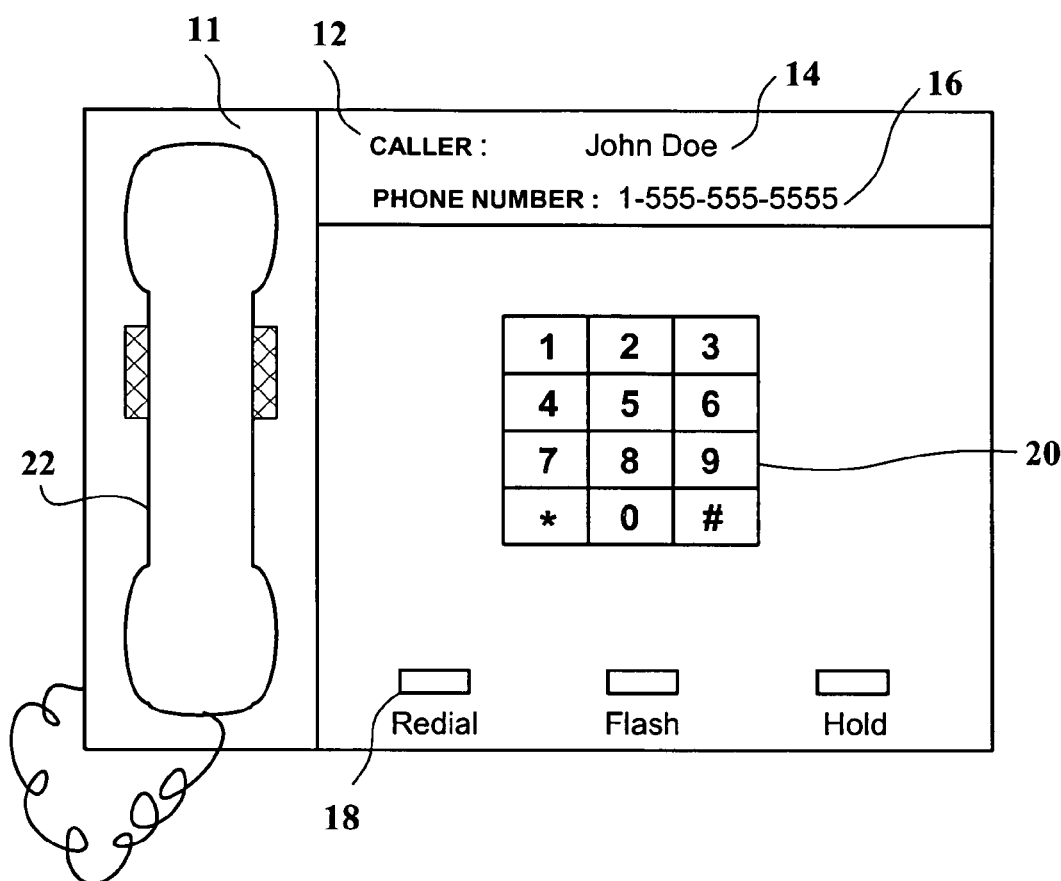
FIG. 1A is an illustration of a prior art telephone system that uses conventional caller identification functionality to display the name and phone number of a caller.
Figure 1B:
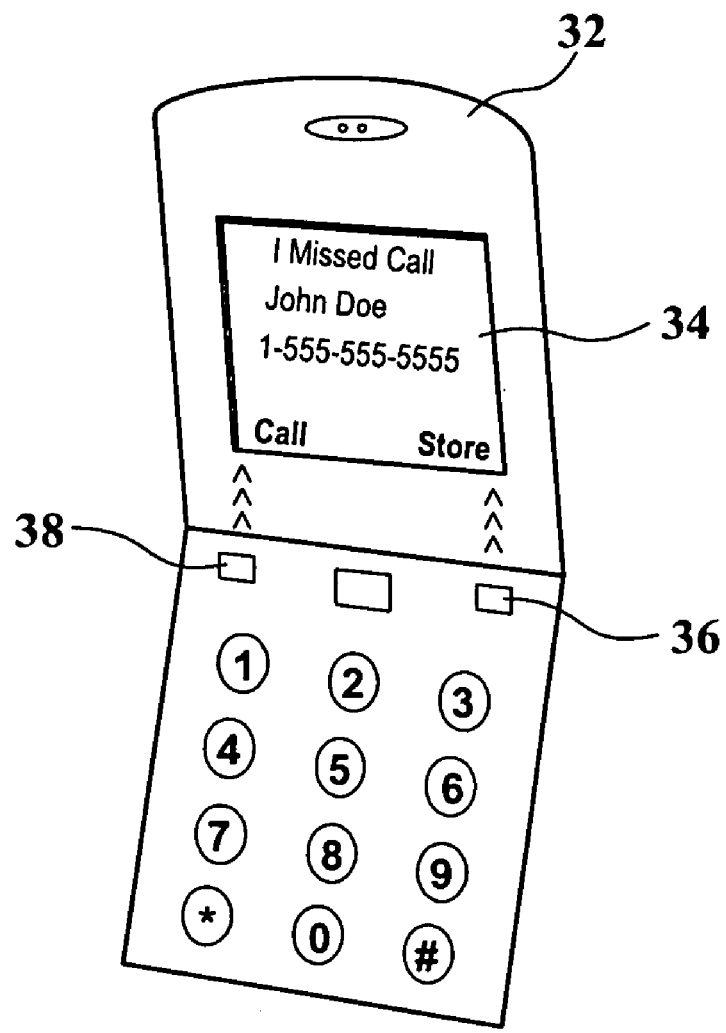
FIG. 1B is an illustration of a prior art cellular phone system that uses conventional caller identification functionality to preset a soft speed dial button for a phone number of a missed call.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail as not to unnecessarily obscure aspects of the present invention.

Notation and Nomenclature

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, bytes, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "setting," "storing," "scanning," "receiving," "sending," "disregarding, " "entering," or the like, refer to the action and processes (e.g., processes 400, 500, 600) of a computer system or similar intelligent electronic computing device, that manipulates and transforms data represented as physical (electronic) quantities within the computer system's registers and memories into other data similarly represented as physical quantities within the computer system memories or registers or other such information storage, transmission or display devices.

Figure 2:
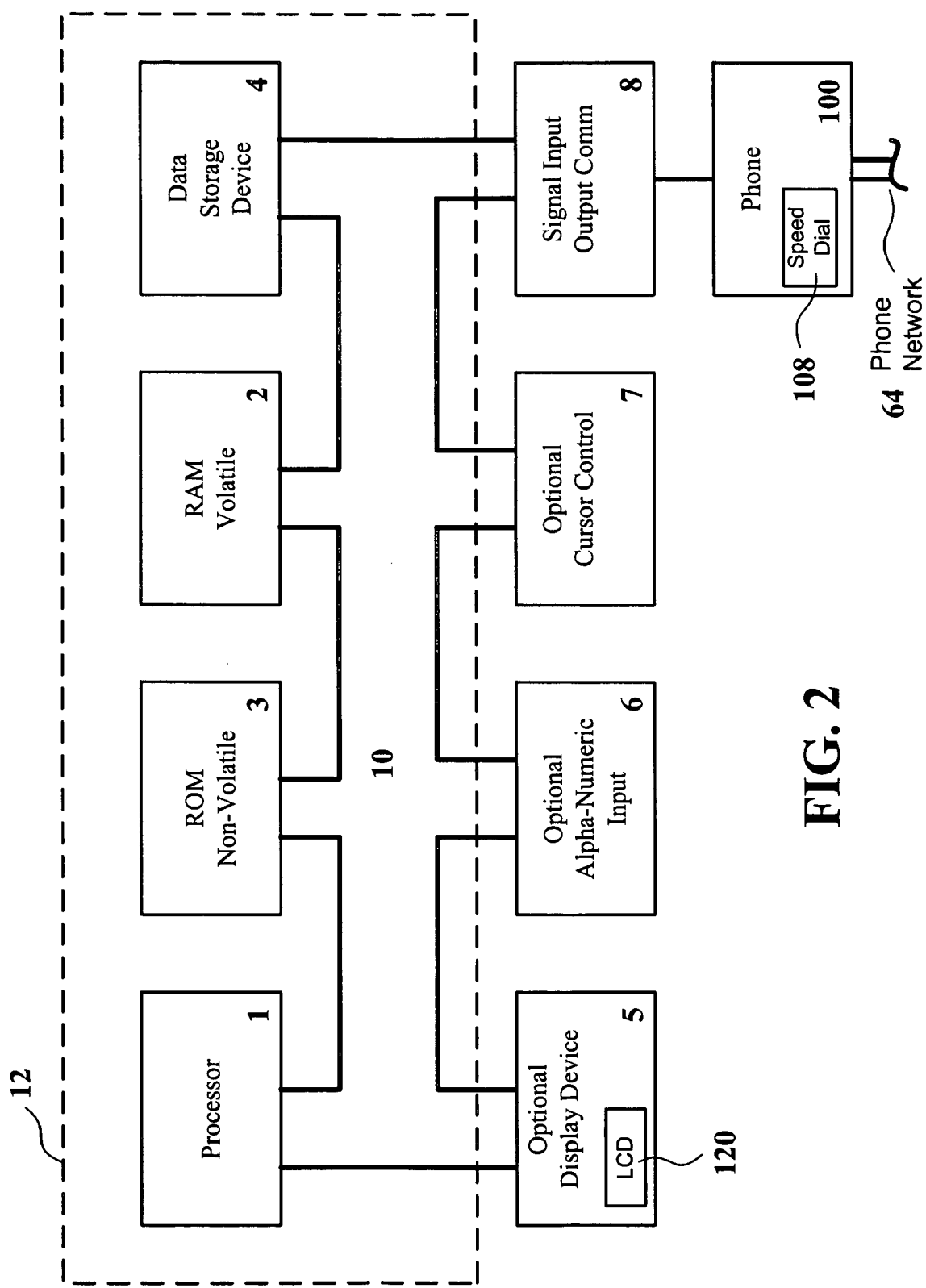
FIG. 2 is a block diagram of an exemplary computer system in accordance with an embodiment of the present invention.

Referring now to FIG. 2, a block diagram of exemplary computer system 12 is shown. It is appreciated that computer system 12 of FIG. 2 described herein illustrates an exemplary configuration of an operational platform upon which embodiments of the present invention can be implemented. Nevertheless, other computer systems with differing configurations can also be used in place of computer system 12 within the scope of the present invention. For example, computer system 12 could be a server system, a personal computer or an embedded computer system such as a mobile telephone or pager system.

Computer system 12 includes an address/data bus 10 for communicating information, a central processor 1 coupled with bus 10 for processing information and instructions, a volatile memory unit 2 (e.g., random access memory, static RAM, dynamic RAM, etc.) coupled with bus 10 for storing information and instructions for central processor 1 and a non-volatile memory unit 3 (e.g., read only memory, programmable ROM, flash memory, EPROM, EEPROM, etc.) coupled with bus 10 for storing static information and instructions for processor 1. Computer system 12 may also contain an optional display device 5 coupled to bus 10 for displaying information to the computer user. One embodiment of the present invention includes the use of LCD display 120. Moreover, computer system 12 also includes a data storage device 4 (e.g., disk drive) for storing information and instructions. In one embodiment of the present invention, data storage device 4 is a cache memory.

Also included in computer system 12 of FIG. 2 is an optional alphanumeric input device 6. Device 6 can communicate information and command selections to central processor 1. Computer system 12 also includes an optional cursor control or directing device 7 coupled to bus 10 for communicating user input information and command selections to central processor 1. Computer system 12 also includes signal communication interface 8, which is also coupled to bus 10, and can be a serial port. Communication interface 8 can also include number of wireless communication mechanisms such as infrared or a Bluetooth protocol. Computer system 12 of FIG. 2 also includes a phone system 100 with a speed dial button 108. Phone system 100 is coupled to a telephone network 64. In one embodiment of the present invention, the telephone system 100 is interfaced on a computer system and uses a voice over IP protocol (VOIP).

Although the system and method for identifying triggers and automatically connecting outgoing calls of the present invention may be implemented in a variety of different electronic systems such as a mobile computer system, an embedded system, etc., one exemplary embodiment includes the implementation on a computer server system. It should be understood that the descriptions corresponding to FIG. 2 provide some general information about an exemplary computing system.

Embodiments of the present invention relate to a computer controlled telephone device such as a computer controlled conventional phone or a voice over IP (VOIP) phone. Embodiments of the present invention provide a phone system that can be programmed to set up an outgoing call based on specific trigger actions. The type of programming is determined by the context of the interactions that the computer can sense that anticipate an outgoing call. For example, if a person is looked up in an address book, the phone should be ready to place a call to the person that was looked up. Furthermore, if an electronic calendar application has a phone conference scheduled, the phone should call all of the parties associated with the phone conference. "Outgoing calls" can be pending calls or preset calls.

Embodiments of the present invention can be used to facilitate set-up of both pending phone calls and preset phone calls. Pending phone calls are ones where the phone connection is already set-up (the phone number has already been dialed and put on hold) and picking up the handset essentially puts the user in a connected phone call (taking the call off hold). Typically, the user might expect both parties on the end of a pending phone call to pick up at the same time, but if one person picks up on a pending call, the other side gets a distinctive phone chirp instead of the usual ring. The parties involved in the conversation typically expect a pending call. In one embodiment of the present invention, a pending call is set up between multiple parties, e.g., a conference call between 10 board members. Preset phone calls are ones where a "programmable speed dial button" is programmed to dial a certain number. Completing the call involves picking up the handset and pressing the "preset" dial button, which initiates a traditional telephony call. In one embodiment of the present invention, a preset telephone call establishes a connection between multiple parties, e.g., a conference call between 10 board members.

Figure 3:
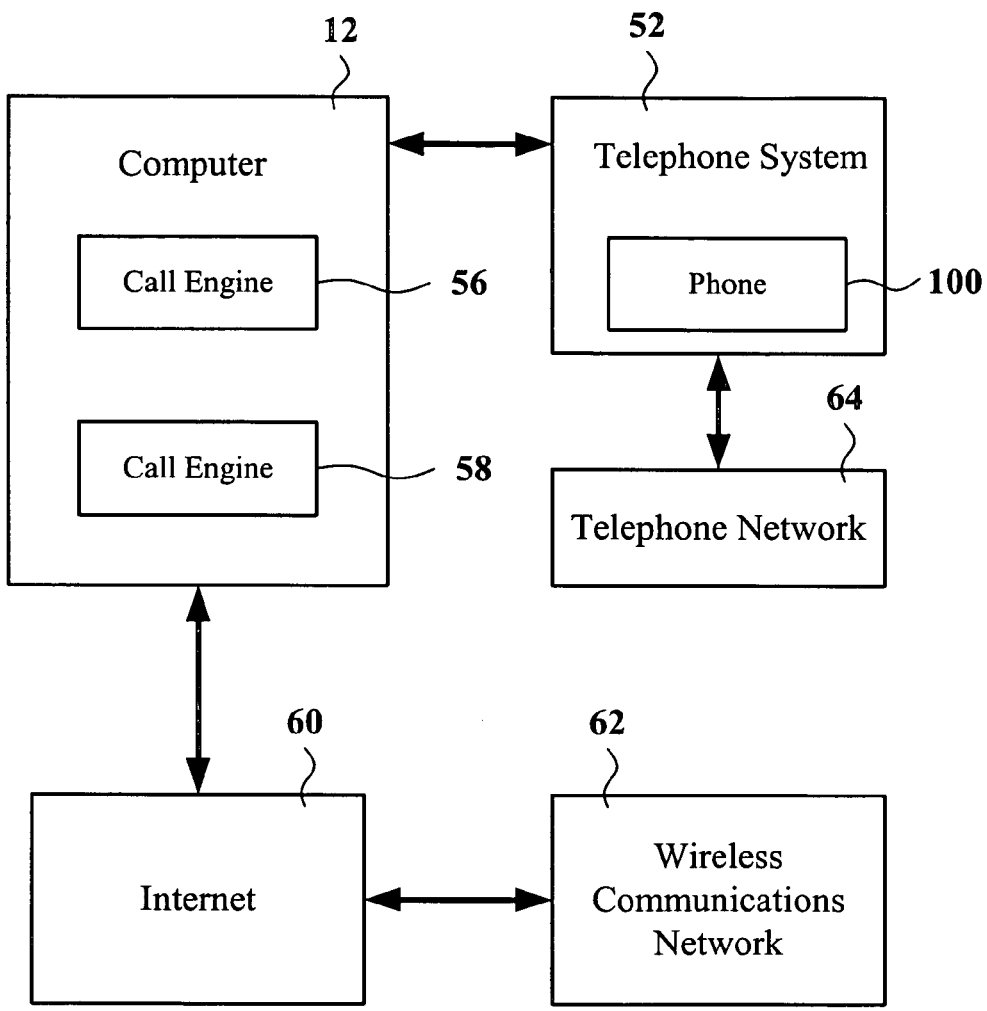
FIG. 3 is a logical block diagram illustrating an exemplary computer system coupled to the Internet and a telephone network in accordance with an embodiment of the present invention.

FIG. 3 is a logical block diagram 50 illustrating an exemplary computer system coupled to the Internet and a telephone network (or could be VOIP through a computer and computer network). Embodiments of the present invention relate to a system and method for identifying triggers for an outgoing call and automatically connecting the call. Computer system 12 comprises a call engine 56 for identifying triggers for outgoing calls and a database 58 for looking up phone numbers associated with an outgoing call. It is appreciated that database 58 could be a resource located on a remote server, but for simplicity database 58 is coupled to computer system 12. Database 58 may obtain information, e.g., caller ID type data, from the call engine 56. The system and method for identifying triggers and automatically connecting outgoing calls of the present invention may be implemented in a variety of different electronic systems such as computer system 12 but, could also be implemented on a portable computer system, an embedded system, etc., one exemplary embodiment includes the implementation on a computer server system.

Coupled to computer 12 is telephone 52 that is also coupled to telephone network 64. In one embodiment of the present invention, telephone system 52 is integrated into computer 12, but could also be coupled to the computer system via a wired or wireless connection. In another embodiment telephone calls are made by utilizing voice over IP to communicate. In another embodiment of the present invention, telephone system 52 is a corporate telephone network for instance wherein a logic device coupled to telephone system 52 controls telephony actions.

In another embodiment of the present invention, computer 12 is coupled to the Internet 60. In an additional embodiment of the present invention, Internet connection 60 may be a corporate Intranet for instance. In addition to the Internet 60, computer system 12 is coupled to a wireless communications network 62. In one embodiment of the present invention, computer 12 is coupled to wireless communications network 62 wirelessly, for example Bluetooth communication. It is appreciated that telephone system 52 includes a telephone device 100 having a handset and a number of buttons that can be programmed, e.g., speed dial buttons.

Figure 4:
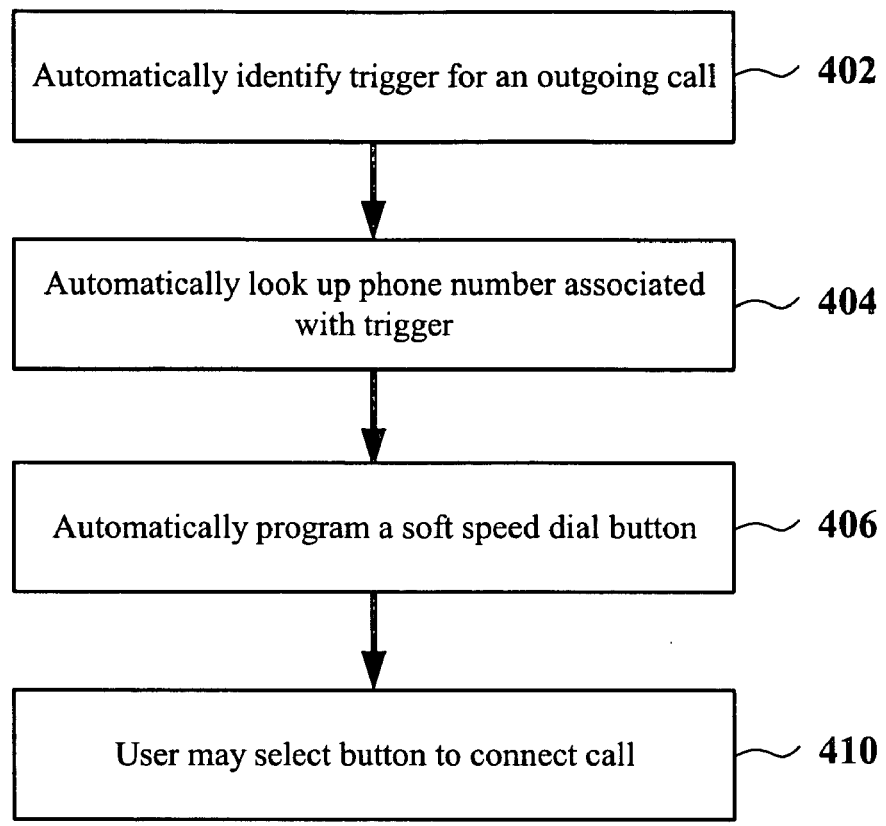
FIG. 4 is a flow diagram illustrating an exemplary process wherein a soft speed dial button is programmed after an associated trigger is identified in accordance with an embodiment of the present invention.

FIG. 4 is a flow diagram 400 of an exemplary process wherein a soft speed dial button is programmed (e.g., on device 100) after an associated trigger is identified in accordance with an embodiment of the present invention. Embodiments of the present invention identify triggers for an outgoing telephone call and automatically perform telephony functions based on the triggers. Flow diagram 400 starts with step 402, identifying a trigger for an outgoing call. In one embodiment of the invention, an activity log is stored in a database such as database 56 of FIG. 3. After a period of time, the activity log is substantial enough for a call engine 58 of FIG. 3 to "learn" triggers for outgoing telephone calls. In addition to an activity log, in one additional embodiment of the present invention, rules can be created manually. For example a rule can be created such that an incoming (or outgoing) electronic mail message triggers an outgoing call.

Once a trigger has been identified, the next step 404 is to look up the phone number associated with the trigger. In one embodiment of the present invention, the phone number is retrieved from the header portion of an electronic message. In an additional embodiment of the present invention, a remote resource, such as a telephone company's central office is accessed for the phone number. Once the phone number is retrieved, the next step 406 is to program the phone number into a soft speed dial button. For clarity, a soft speed dial button is a dynamic speed dial button that can be programmed. Once programmed, the phone number can be dialed by selecting the button. The steps of programming 406 may include presenting an identifier of the person whose phone number has just been programmed into the speed dial button, e.g., by the use of a small display on the phone device associated with the speed dial button. In one embodiment of the invention, the telephone system is integrated into a computer system. In this embodiment, a soft speed dial button can be accessed and selected through a graphical user interface. The last step 410 is to select the soft speed dial button to connect the call. After setting up a preset telephone call, a user must select a soft speed dial button to connect the call. Alternatively, after establishing a pending call, a user can just "pick up the receiver" to connect the call.

Figure 5:
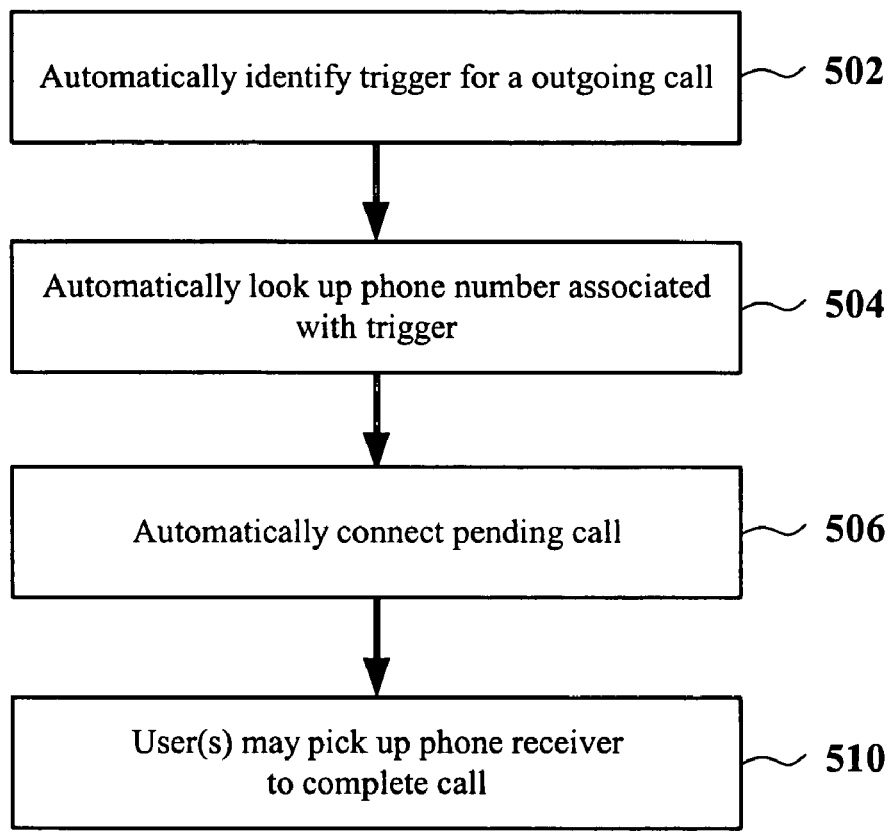
FIG. 5 is a flow diagram illustrating an exemplary process wherein a pending call is connected after an associated trigger is identified in accordance with an embodiment of the present invention.

FIG. 5 is a flow diagram 500 illustrating an exemplary process wherein a pending call is connected after an associated trigger is identified in accordance with an embodiment of the present invention. A pending phone call is a call that is essentially connected between two or more parties and then placed on hold awaiting users to "pick up the receiver" to complete the call. A pending call is convenient because the caller merely needs to pick up the receiver to talk with the other party(s). When transitioning to a pending call, the first step 502 is to identify a trigger for an outgoing call. This step is similar to step 402 of FIG. 4. The next step 504 is to access a phone number associated with the trigger. The next 506 is to connect the pending call. The call will be connected through the phone network, waiting for users to complete the call by "picking up the receiver." The last step 510 is to pick up the receiver to complete the call. It is appreciated that a user does not need to physically pick up the receiver. The phrase "pick up the receiver" has been used for descriptive purposes. It is recognized that many telephones utilize different telephony functions to "pick up the receiver," e.g., press a phone button to invoke a speaker phone or headset function.

A pending call does not require additional user involvement other than "picking up the receiver." In most instances, users involved in a pending call will anticipate the pending call and will "pick up the receiver" essentially at the same time. If for some reason a user does not pick up the receiver, a notification will be sent to alert the user that a pending call has been established. In one embodiment of the present invention, a user will receive an audible notification of a pending call. In another embodiment, a user will receive a visual notification of a pending call.

In one embodiment of the present invention, the trigger action can be the performance of a call on a cell phone near the telephone device to be programmed. In this scenario, a user talking on a cell phone arrives at his/her desk at work, a location is determined, which automatically connects the desk phone with the conversation on the cell phone. The user can then disengage the cell phone and continue the conversation on the desk phone. In one embodiment of the invention, a location is determined using a global positioning system (GPS). In another embodiment, a location is determined from a cellular phone signal. Furthermore, in another embodiment, location is determined from a computer log-in, wherein a user is assumed to be located at a location where they are logged into a computer.

The reverse is also possible with the preset automatically dialing the cell phone so the user can continue a phone call initiated at the desk phone and then continued on the cell phone.

Figure 6:
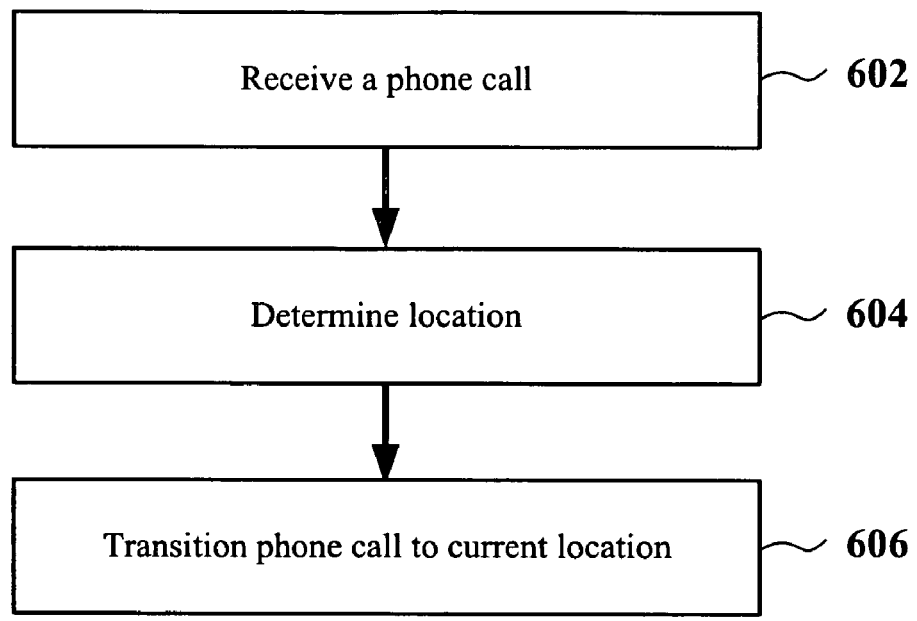
FIG. 6 is a flow diagram of an exemplary process wherein the location of a user is determined and an incoming call is directed to the location of the user in accordance with an embodiment of the present invention.

FIG. 6 is a flow diagram 600 of an exemplary process wherein the location of a user is determined and an incoming call is directed to the location of the user in accordance with this embodiment of the present invention. The first step 602 is to receive a telephone call. For example, a call is made to a work phone number. The next step 604 is to determine the location of the called party. The location of the called party can be determined by many different methods. For example, in one embodiment of the present invention, the location of a called party can be determined by a Global Positioning System (GPS). GPS can be used in conjunction with a cellular phone signal to locate the position of a called party. In an alternate embodiment, location can be determined by examining whether or not the user is logged into a computer. For example, it can be determined that a called party is at "the office" if they have logged into a computer that resides in the office. If a called party is logged into a computer at work, most likely the called party is in their office. The last step 606 is to transition the phone call to the current location of the called party. For example, a user receives an incoming call on a cellular phone while driving to work. If the call continues until the called party reaches work, and the called party has logged into a work Intranet, the call would be transitioned from the cellular phone to an office phone because the call engine would recognize that the called party's location was at "work."

Figure 7A:
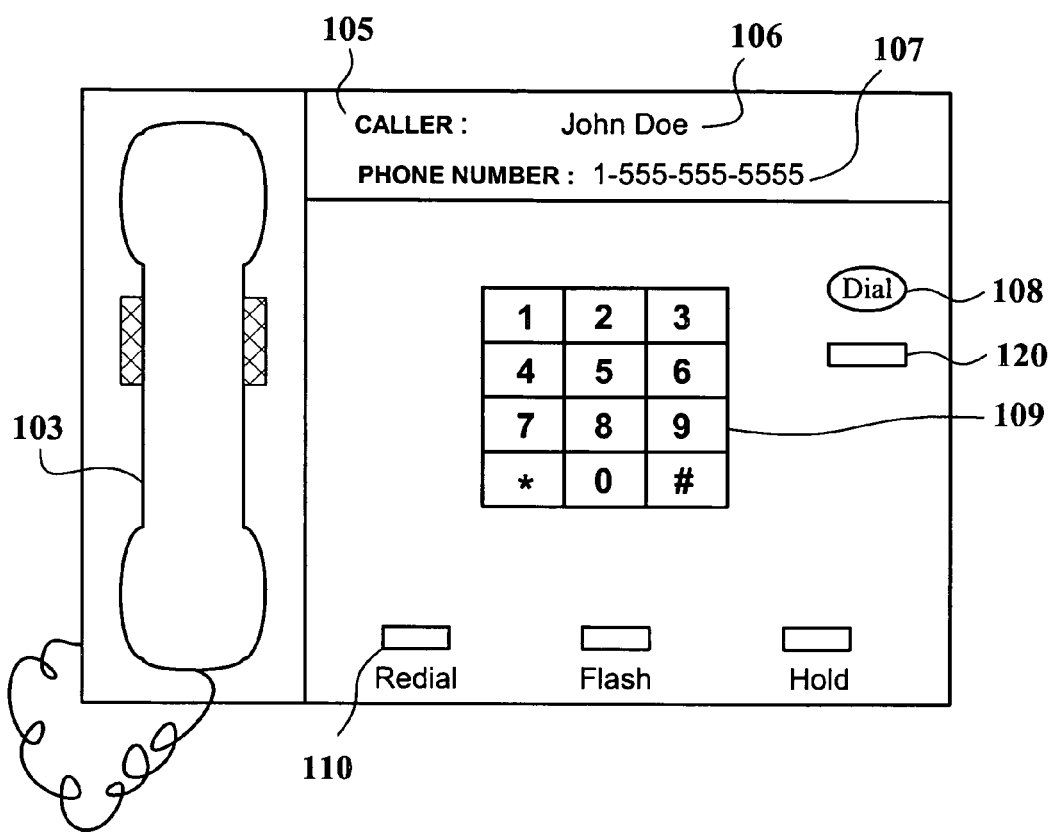
FIG. 7A is an illustration of an exemplary telephone system that uses a soft speed dial button in accordance with an embodiment of the present invention.
Figure 7B:
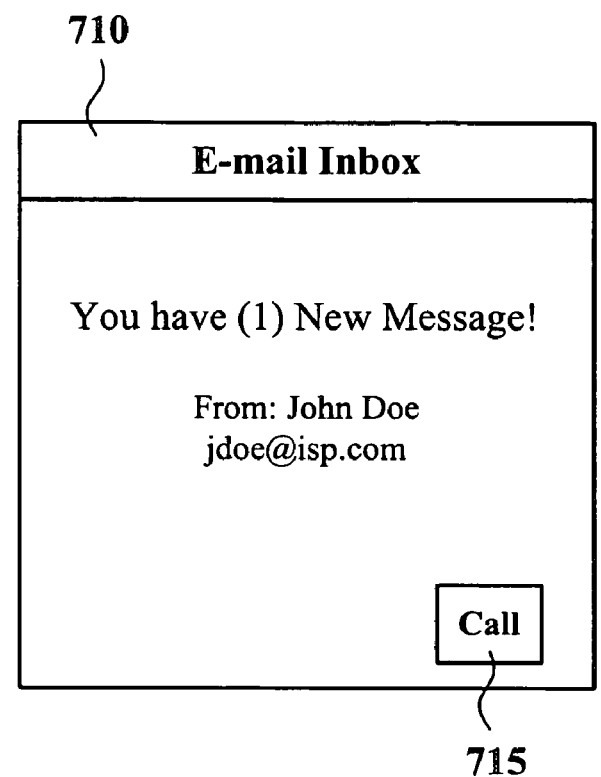
FIGS. 7B through 7E are illustrations of triggers that would prompt an outgoing phone call in accordance with an embodiment of the present invention.
Figure 7C:
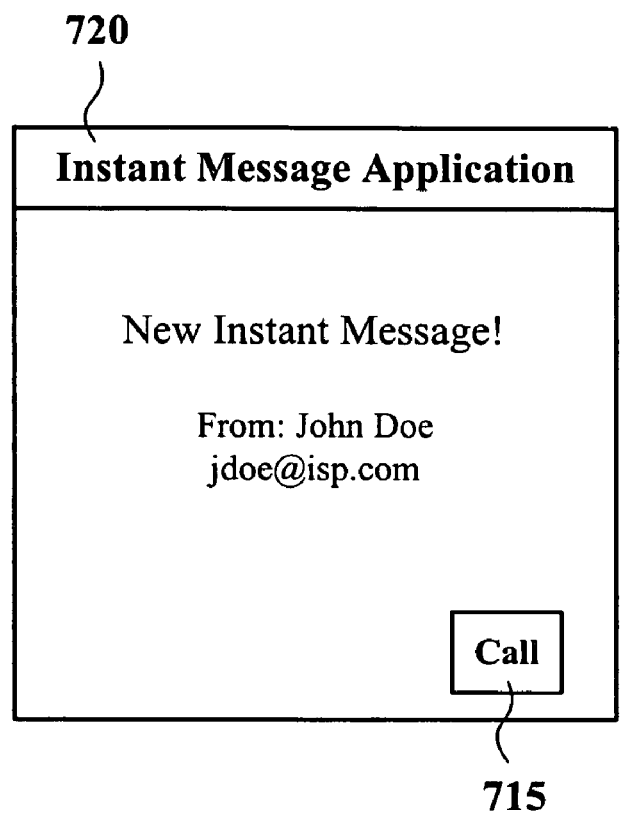
Figure 7D:
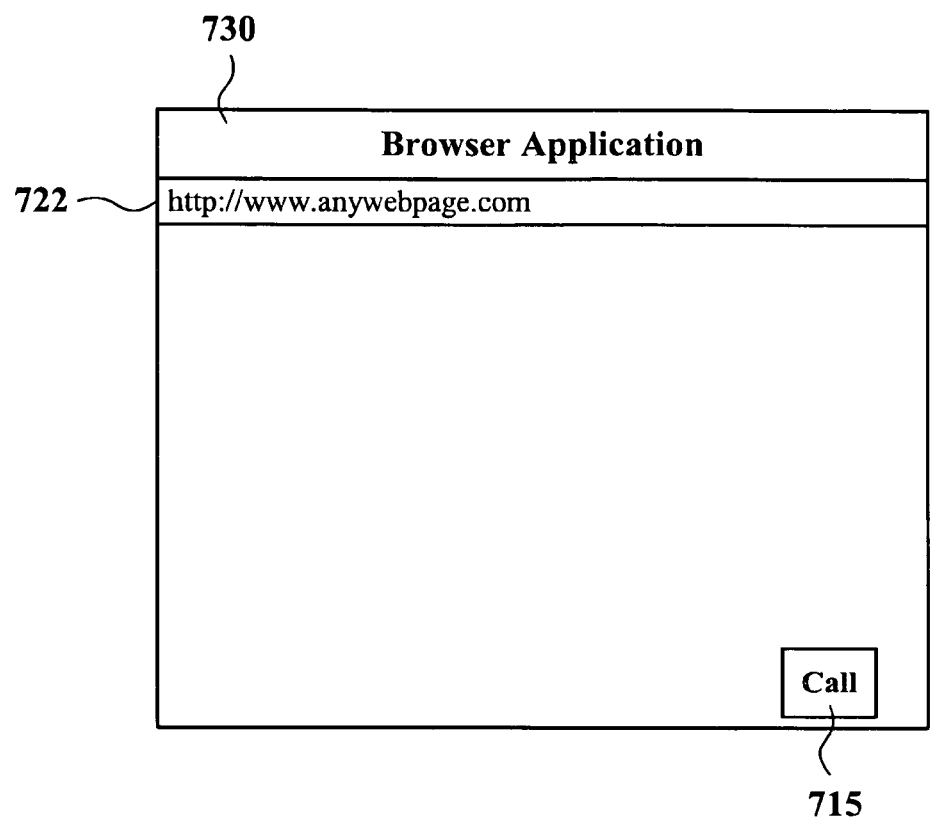
Figure 7E:
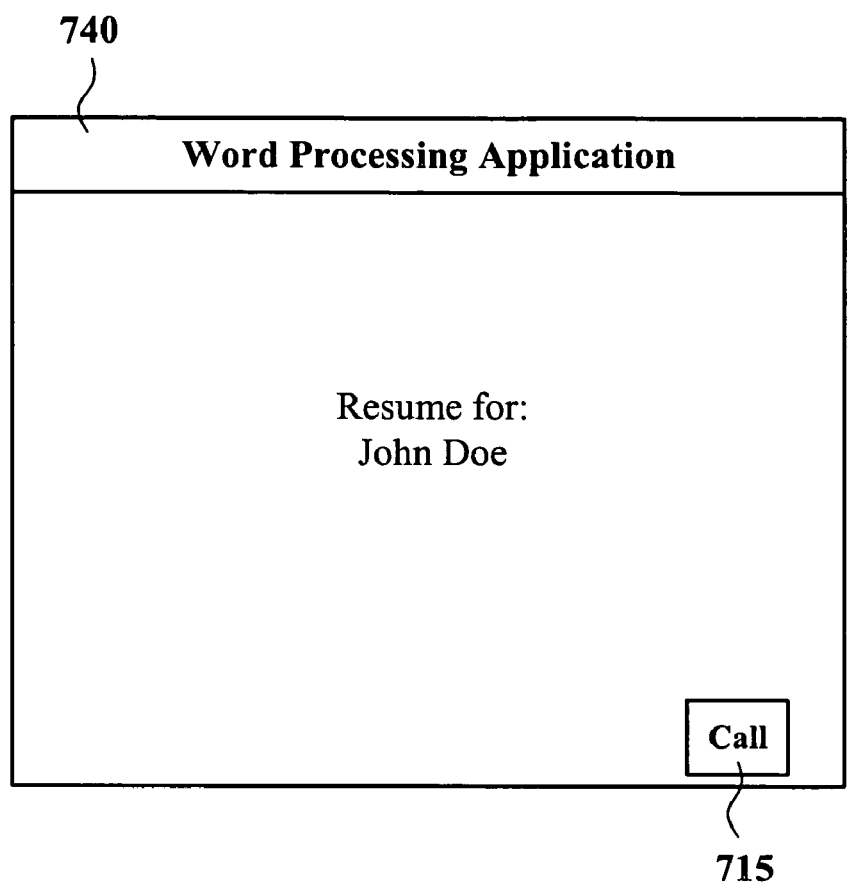
Figure 8:
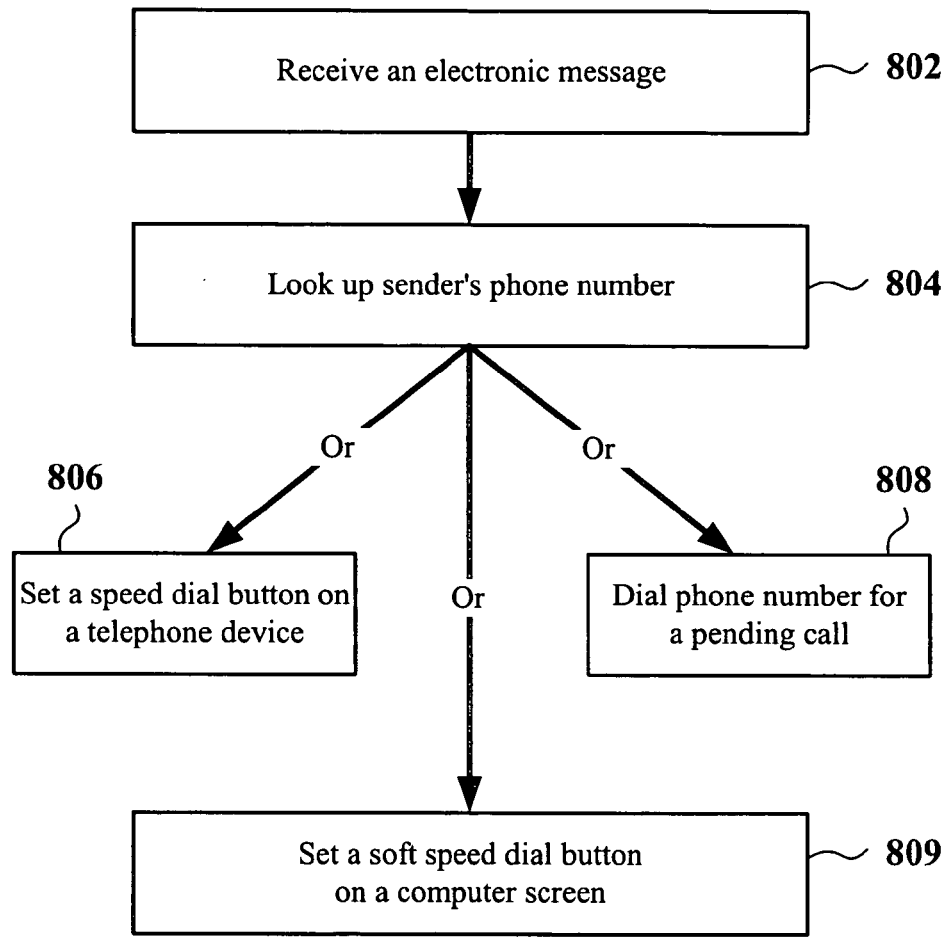
FIG. 8 is a flow diagram of an exemplary process wherein an electronic mail message triggers an outgoing call in accordance with an embodiment of the present invention.
Figure 9:
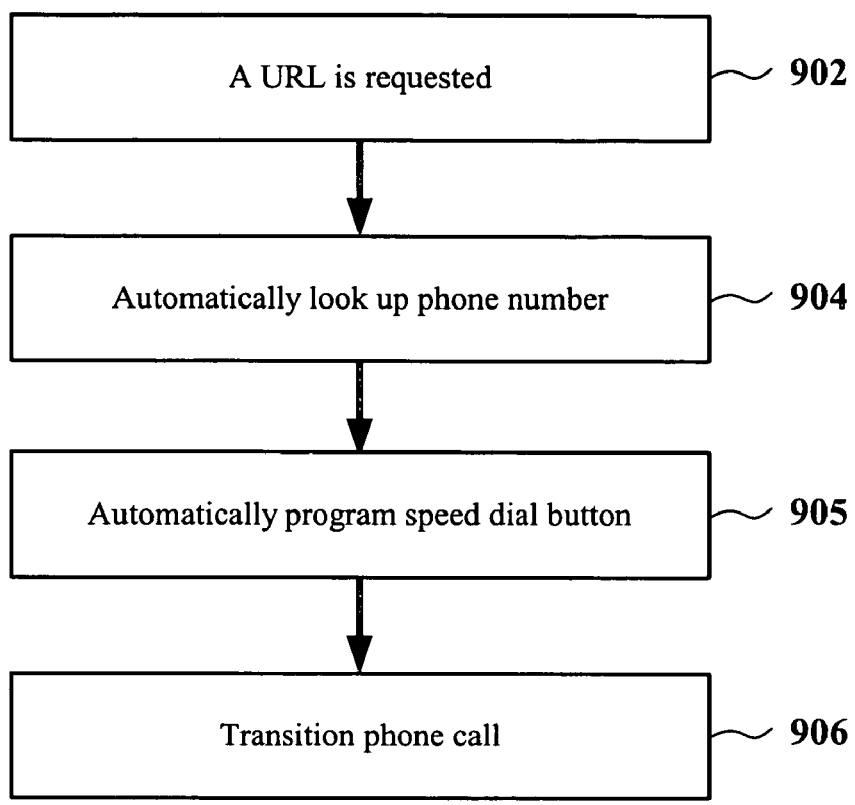
FIG. 9 is a flow diagram of an exemplary process wherein a URL request triggers an outgoing call in accordance with an embodiment of the present invention.
Figure 10:
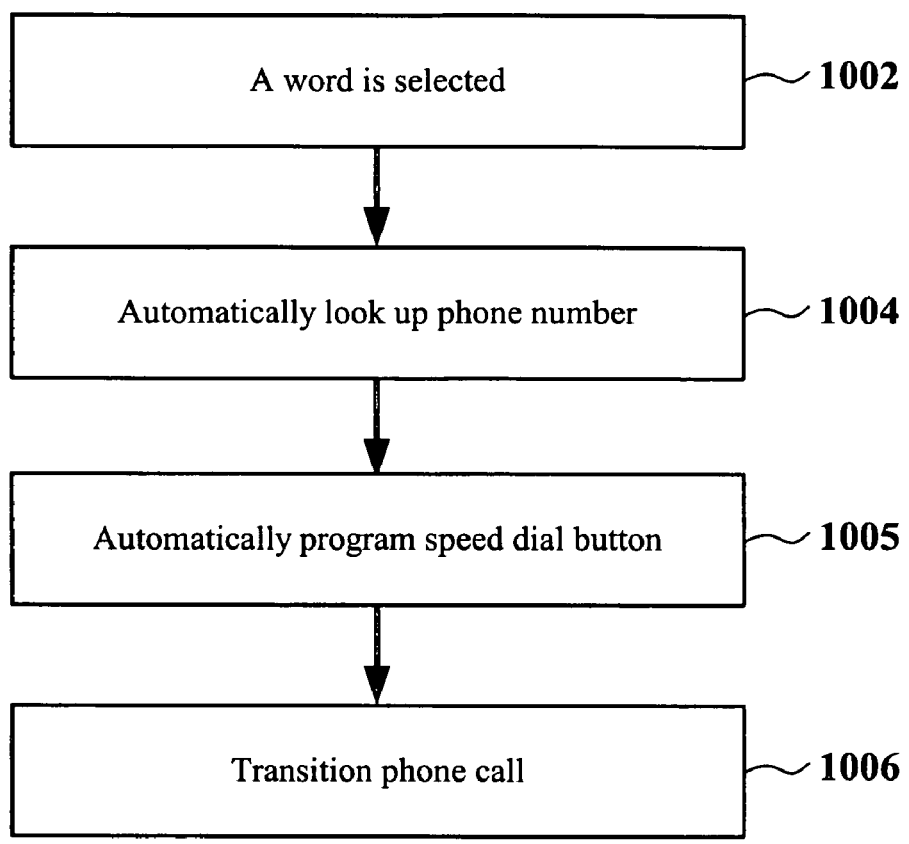
FIG. 10 is a flow diagram illustrating an exemplary process wherein highlighting a word triggers an outgoing call in accordance with an embodiment of the present invention.

FIGS. 7A–7E provide illustrations of a novel telephone phone system and exemplary triggers for outgoing calls according to embodiments of the method of the present invention as set forth in the flow charts of FIGS. 8, 9 and 10. For purposes of clarity, the following discussion will utilize illustrations of FIGS. 7A–7E in conjunction with the flow charts 800, 900 and 1000 of FIGS. 8, 9, and 10 to clearly describe the embodiments of the present invention.

FIG. 7A is an illustration of an exemplary telephone system 100 in accordance with an embodiment of the present invention. In one embodiment of the present invention, telephone system 100 is integrated into a computer system such as computer 12 of FIG. 3, but for clarity purposes, telephone system 100 will be described separately and is illustrated in FIG. 7A. Telephone system 100 comprises the functionality of a conventional telephone, but is coupled to a computer system that has the capability to connect outgoing telephone calls based on recognized triggers. FIGS. 7B through 7E illustrate triggers associated with outgoing telephone calls and will be described in conjunction with FIG. 7A. Telephone system 100 comprises conventional functionality such as a redial button 110. In addition, a soft speed dial button 108 enables calls to be connected with the press of a button. For example, a phone number can be programmed so when speed dial button 108 is pressed, the phone number is automatically dialed. In addition to speed dial button 108, telephone system 100 comprises a conventional key pad 109, a receiver 103 and an optional caller ID display 105 which displays a caller's name 106 and a caller's phone number 107. If telephone system 100 is integrated into a computer system, many of the functionality is accessed through a graphical user interface by way of a soft speed dial button displayed on a computer screen. For example, button selections can be selected with a mouse click. A small display device, e.g., a liquid crystal display (LCD) 120 may be optionally used to identify the party currently programmed into the soft speed dial button 108.

FIG. 7B is an illustration of an electronic mail message trigger 400 for an outgoing call. In addition to FIG. 7B, FIG. 7C will be described in conjunction with FIG. 8. Flow chart 800 of FIG. 8 begins with step 802. At step 802, the present embodiment of the invention receives an electronic message. In one embodiment of the invention, an electronic message can be an e-mail and in another embodiment of the invention, an electronic message can be an instant message. In an additional embodiment of the invention, an outgoing electronic message is used as a trigger for an outgoing telephone call. After receiving an electronic message, further communication is often needed. The receiver of an electronic message can either send a reply e-mail, instant message or they can use an alternate method of communication. It has been observed that often an electronic message is a trigger for an outgoing telephone call. For example, an e-mail is sent from management regarding an important report document. Rather than replying with an electronic message, the recipient would rather speak to the sender on the phone. The present invention will recognize the incoming electronic message and transition the communication from e-mail or instant messaging to the telephone.

The second step 804 of FIG. 8 is to look up the sender's phone number. The look up can be accomplished in many different ways. For example, in one embodiment of the present invention, an "address book" database is accessed and a phone number that is associated with an e-mail address or screen name is accessed. In FIG. 7B, an electronic message 700 is received and saved to an in-box 710 of an e-mail application. Many electronic message clients display the name and e-mail address associated with a new message. In FIG. 7B, a new message is received from "John Doe" and the associated e-mail address is "jdoe@isp.com." In FIG. 7C an instant message 720 has been received. Once the sender has been identified, a look up is completed to retrieve a phone number associated with the sender. In one embodiment of the present invention, a remote resource is accessed to retrieve the phone number. For example, an HTTP resource such as an Internet search engine could be utilized to access a phone number. In an alternate embodiment of the present invention, a sender's phone number is accessed from a header portion of the electronic message.

The next step in FIG. 8 can be to set a soft speed dial button 806 (preset) or to dial the phone number for a pending call 808. The difference between a soft speed dial call and a pending call has been described above. In one embodiment of the present invention, a user can manually select between the two options. In one embodiment, a soft speed dial button 715 of FIGS. 7B and 7C is programmed by a computer system. In this embodiment, a user can call the phone number by selecting the soft speed dial button 715 with a click of a mouse, or by selecting the programmed speed dial button on the telephone device 100.

FIG. 7D is an illustration 703 of a URL used as a trigger for an outgoing telephone call in accordance with an embodiment of the present invention. Process 900 of FIG. 9 describes the steps performed when using a URL as a trigger for an outgoing call. For clarity, process 900 of FIG. 9 will be described in conjunction with FIG. 7D. FIG. 7D illustrates a user's browser application 730 and a URL 722. It is observed that many times visiting a specific URL triggers an outgoing phone call to the party hosting or developing the URL. For example, a user doing online banking may wish to contact their bank while or after visiting the bank's URL. If the user is visiting a specific URL and wants to place a call to the party associated with the URL, a soft speed dial button 715 (or a programmed speed dial on telephone 100) can be selected to complete the call. The first step 902 of process 900 is to request a URL. Once the URL is accessed the next step 904 is to look up a phone number associated with the URL. In one embodiment of the present invention the phone number associated with a specific URL is retrieved from the header portion of an HTML document. In another embodiment of the present invention a phone number associated with a specific URL is retrieved from a remote resource such as an Internet search engine. At step 906, a speed dial button 108 on a telephone device 100 or a soft speed dial button 715 can be programmed with the number obtained at step 904. The user can use either to facilitate the call.

FIG. 7E is an illustration 704 of using a highlighted word as a trigger for an outgoing telephone call. For clarity purposes, FIG. 7E will be described in conjunction with process 1000 of FIG. 10. The first step 1002 of process 1000 is to select a word. For example, FIG. 7E illustrates a word processing application 740 and a document is open called "Resume for John Doe." In one embodiment of the present invention, a user can select a word by highlighting it with the cursor or mouse. For example, a user could select the text "John Doe" and the call engine 56 of FIG. 3 would perform the next step 1004 in process 1000, which is to look up the phone number associated with the highlighted word. The next step is to program the speed dial button and then step 1006 is to transition the phone call. As described above, the transitioned phone call can be a preset soft speed dial button 715 or a speed dial button 108 as a pending or preset phone call.

Figure 11A:
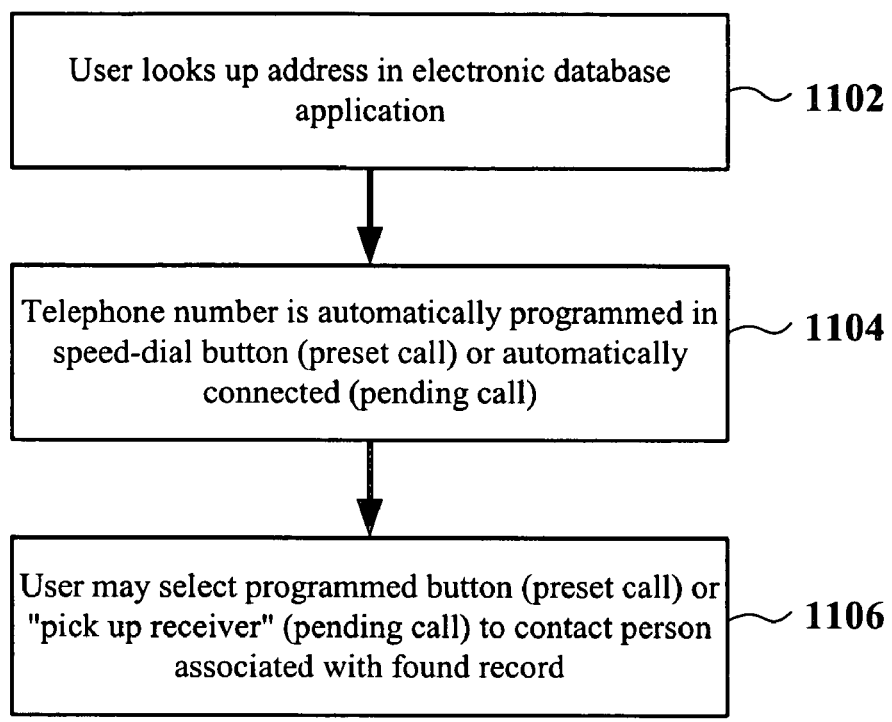
FIG. 11A is a flow diagram of an exemplary process wherein an electronic database inquiry triggers an outgoing phone call in accordance with an embodiment of the present invention.
Figure 11B:
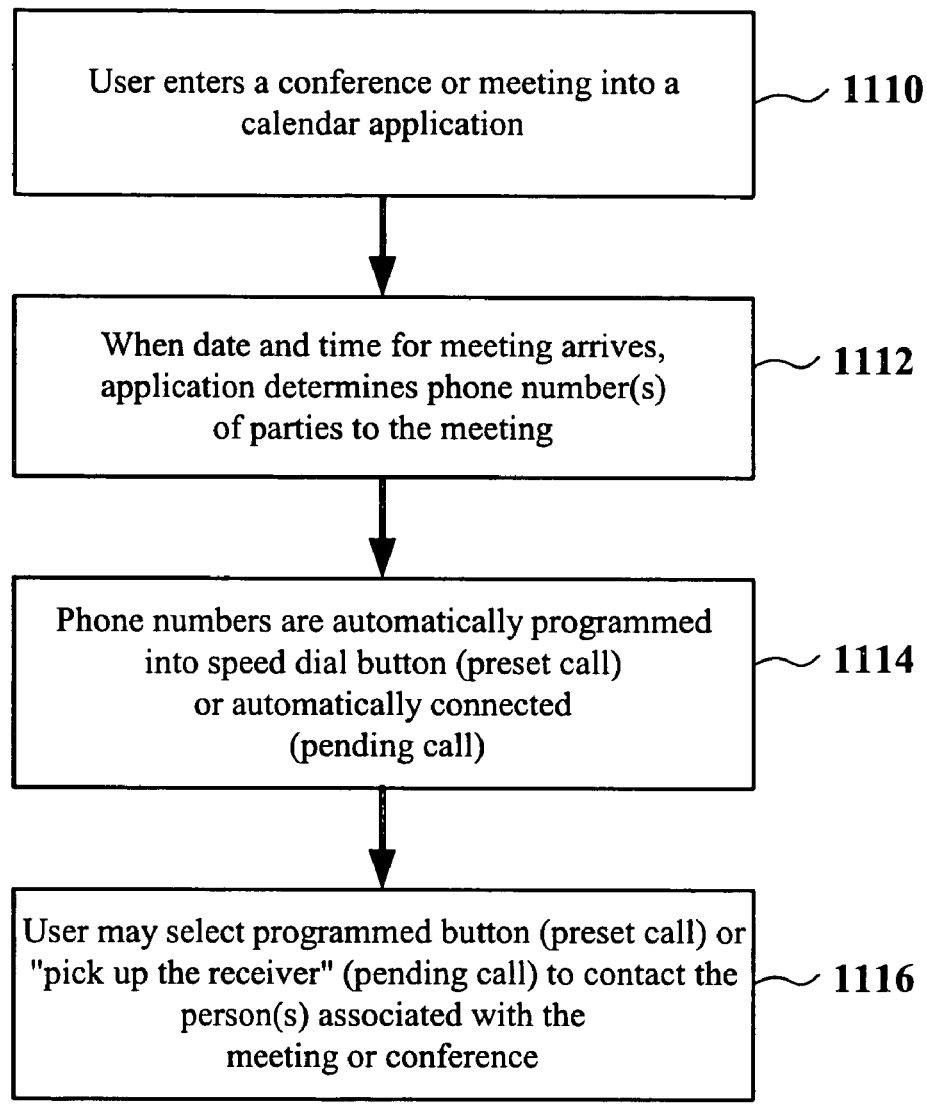
FIG. 11B is a flow diagram of an exemplary process wherein entering data into an electronic calendar database triggers an outgoing phone call in accordance with an embodiment of the present invention.

FIGS. 11A and 11B are flow diagrams illustrating an exemplary process wherein an electronic address query triggers an outgoing telephone call in accordance with an embodiment of the present invention. Specifically, FIG. 11A is a flow diagram illustrating an exemplary process wherein looking up an address in an electronic database triggers an outgoing call to the person that was looked up. The first step 1102 is to look up an address in an electronic application database. The next step 1104 is the telephone number of the located record is automatically programmed in a speed dial button for a preset call or automatically connected for a pending call. The next step 1106, for a preset call, a user may wish to select the programmed button to contact the person associated with the found record. For a pending call, the user needs to "pick up the receiver" to contact the person associated with the found record. It is appreciated that when using a pending telephone call, the users do not need to "press" a preset button. When using a preset call, the user may press the speed dial button to dial the number associated with the found entry.

FIG. 11B is an illustration of an exemplary process wherein entering a conference call in an electronic calendar application triggers an outgoing telephone call in accordance with an embodiment of the present invention. The first step 1110 is a user enters the time and date of a conference telephone call into an electronic calendar application. In one embodiment of the present invention, a user also enters the parties invited to the telephone conference call. The next step 1112 is when the date and time of the conference call arrive, the application determines the phone number(s) of the parties invited to the conference call.

Next, in step 1114, for a preset call, the phone number(s) of the invited parties are programmed into a speed dial button. For a pending call, the parties involved are automatically connected. Lastly, in step 1116, the user may wish to contact the person(s) associated with the conference call using a preset or pending phone call. In this step, a user can initiate the call by picking up the handset or by using methods mentioned above. When using a preset call, the user may press the speed dial button to call the number(s) associated with the meeting or conference. When using a pending call, the callers are automatically connected and to initiate conversation, the users need to "pick up the receiver."

In addition to audio conversations, the present invention can be implemented to facilitate other modes of communication such as video conferencing. It is appreciated that the present invention is not limited to audio communication, but can be implemented to facilitate many different modes of communication. It is also appreciated that a telephone conversation can comprise a video component as well as an audio component. For example, when using VOIP, a video component can be provided in addition to the audio component to enhance communication between parties.

Embodiments of the present invention, a system and method for connecting pending and preset telephone calls to facilitate transitioning to a phone call have been described. While the present invention has been described in particular embodiments, it should be appreciated that the present invention should not be construed as limited by such embodiments, but rather construed according to the following Claims.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and it's practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A system for facilitating a connection of an outgoing telephone call comprising:
   a computer system comprising a processor coupled to a bus and a database coupled to the bus;
   a call engine coupled to the bus wherein the call engine automatically identifies a trigger action associated with a telephone call and, in response to automatically identifying the trigger action, automatically retrieves a phone number associated with the trigger action; and
   a telephone coupled to the computer system, wherein the computer system functions independently of the telephone, the telephone comprising a speed dial button wherein the computer system automatically programs the speed dial button with the phone number in response to the trigger action, the telephone being capable of automatically dialing the phone number over a telephone network by utilizing the speed dial button.

2. The system as described in claim 1 wherein the computer system is coupled to the Internet.

3. The system as described in claim 1 wherein the computer system is coupled wirelessly to the telephone network.

4. The system as described in claim 1 wherein the call engine retrieves the phone number from a remote server.

5. The system as described in claim 1 wherein the trigger action is receiving an electronic message.

6. The system as described in claim 5 wherein the electronic message is an electronic mail message and wherein the electronic mail message is received by a user interacting with the computer system.

7. The system as described in claim 6 wherein the phone number is accessed from a header portion of the electronic mail message.

8. The system as described in claim 5 wherein the electronic message is an instant electronic message, the instant electronic message sent by a sender, the phone number corresponding to the sender.

9. The system as described in claim 1 wherein the trigger action is requesting a URL.

10. The system as described in claim 1 wherein the trigger action is selecting text.

11. The system as described in claim 10 wherein selecting text comprises selecting text from a document wherein the text is associated with a telephone number.

12. The system as described in claim 1 wherein the phone number is accessed from a remote server.

13. The system as described in claim 1 wherein the trigger action is identified by the call engine in response to the call engine examining a call history and associated actions and, based thereon, anticipating an outgoing call from the call history.

14. The system as described in claim 1 wherein the programmable speed dial button connects multiple parties for a conference call.

15. The system as described in claim 1 wherein the trigger action is a query into an electronic phone book database application and wherein the phone number is associated with a located record of the electronic phone book database.

16. The system as described in claim 1 wherein the trigger action is identifying a date and time associated with a scheduled meeting as recorded in an electronic calendar application database and wherein the phone number is associated with a member of the scheduled meeting.

17. The system as described in claim 1 wherein the trigger action is a user arriving at a predetermined location and wherein the phone number is associated with a telephone located at the predetermined location.

18. The system as described in claim 1 wherein the outgoing telephone call comprises a video element.

19. The system as described in claim 1 wherein a voiceover IP protocol is used to connect the outgoing telephone call.

20. The system as described in claim 1 wherein the telephone device dials the phone number in response to an activation of the speed dial button.

21. The system as described in claim 1 wherein the speed dial button is a soft button displayed on a graphical user interface.

22. A method for using a computer system to facilitate a communication over a telephone line, the communication initiated by a telephone device, the telephone device comprising a speed dial button and coupled to the computer system, wherein the computer system functions independently of the telephone device, the method comprising:
- automatically identifying a trigger event, wherein automatically identifying the trigger event is executed by the computer system;
- automatically determining a telephone number associated with the trigger event, in response to identifying the trigger event, wherein determining the telephone number associated with the trigger event is executed by the computer system: and
- automatically programming the speed dial button with the telephone number, in response to the trigger event, to facilitate the communication, wherein programming the speed dial button is executed by the computer system and wherein the telephone device is capable of automatically dialing the phone number over a telephone network by utilizing the speed dial button.

23. A method as described in claim 22 wherein the trigger event is a user receiving an electronic mail message and wherein the telephone number is associated with a sender of the electronic mail message and wherein the telephone communication is between the user and the sender.

24. A method as described in claim 23 wherein the phone number is accessed from a header portion of the electronic mail message.

25. A method as described in claim 22 wherein the trigger event is a user receiving an instant electronic message and wherein the telephone number is a telephone number associated with a sender of the instant electronic message and wherein the telephone communication is between the user and the sender.

26. A method as described in claim 22 wherein the trigger event is a user locating a record in an electronic database corresponding to a particular person and wherein the telephone number is a telephone number associated with the particular person and wherein the telephone communication is between the user and the particular person.

27. A method as described in claim 22 wherein the trigger event is the occurrence of a date and time corresponding to a scheduled meeting as recorded in an electronic calendar database and wherein the telephone number is a telephone number associated with a person involved in the meeting and wherein the telephone communication is between the user and the person.

28. A method as described in claim 22 wherein the trigger event is a user accessing a web page over the Internet and wherein the telephone number is a telephone number associated with the web page.

29. A method as described in claim 22 wherein the telephone communication is a preset telephone call wherein multiple parties are connected.

30. A method as described in claim 22 wherein the speed dial button is a mechanical button integrated on the telephone device.

31. A method as described in claim 22 wherein the speed dial button is a graphical user interface element of a display screen of the computer system.

32. A method as described in claim 22 wherein automatically determining the telephone number associated with the trigger event further comprises accessing a remote database with information obtained from the trigger event to obtain the telephone number.

33. A method as described in claim 22 wherein automatically determining the telephone number associated with the trigger event further comprises accessing information from the trigger event to obtain the telephone number.

34. A method as described in claim 22 wherein the trigger event is a user reaching a predetermined location and wherein the telephone number facilitates a transfer of a telephone communication from one telephone device to another telephone device located at the predetermined location.

35. The method as described in claim 22 wherein the phone number is accessed from a remote server.

36. The method as described in claim 22 wherein the trigger event is identified by a call engine in response to the call engine examining a call history and associated actions and based thereon anticipating an outgoing call from the call history.

37. The method as described in claim 22 wherein the trigger event is requesting a URL.

38. The method as described in claim 22 wherein the trigger action is selecting text from a document wherein the text is associated with a telephone number.

39. The method as described in claim 22 wherein the programmable speed dial button connects multiple parties for a conference call.

40. The method of claim 22 wherein the telephone call comprises a video element.

* * * * *